United States Patent
Porte et al.

(10) Patent No.: US 11,427,343 B2
(45) Date of Patent: Aug. 30, 2022

(54) AIR INTAKE STRUCTURE OF AN AIRCRAFT NACELLE

(71) Applicant: AIRBUS OPERATIONS (S.A.S.), Toulouse (FR)

(72) Inventors: Alain Porte, Colomiers (FR); Jacques Lalane, Saint Orens de Gameville (FR); Florent Mercat, Toulouse (FR)

(73) Assignee: AIRBUS OPERATIONS (S.A.S.), Toulouse (FR)

( * ) Notice: Subject to any disclaimer, the term of this patent is extended or adjusted under 35 U.S.C. 154(b) by 553 days.

(21) Appl. No.: 16/560,344

(22) Filed: Sep. 4, 2019

(65) Prior Publication Data
US 2020/0070993 A1    Mar. 5, 2020

(30) Foreign Application Priority Data

Sep. 5, 2018   (FR) ...................... 1857967

(51) Int. Cl.
*B64D 33/02*  (2006.01)
*B64D 15/12*  (2006.01)
(Continued)

(52) U.S. Cl.
CPC ............. *B64D 33/02* (2013.01); *B64D 15/04* (2013.01); *B64D 15/12* (2013.01); *B64D 29/00* (2013.01);
(Continued)

(58) Field of Classification Search
CPC .. F02C 7/045; F02C 7/047; B64D 2033/0206; B64D 2033/0233;
(Continued)

(56) References Cited

U.S. PATENT DOCUMENTS 8,991,054 B2 * 3/2015 Porte .................... G10K 11/168
 29/505
9,719,422 B2 * 8/2017 Porte ...................... F02C 7/045
(Continued)

FOREIGN PATENT DOCUMENTS

CN    103561948 A  *  2/2014   ............... B32B 3/02
CN    113811487 A  *  12/2021  ............. B64D 33/02
(Continued)

OTHER PUBLICATIONS

French Search Report and Written Opinion for FR1857967, dated May 13, 2019, 9 pages.

*Primary Examiner* — Craig Kim
(74) *Attorney, Agent, or Firm* — Nixon & Vanderhye P.C.

(57) ABSTRACT

An air intake structure for an aircraft nacelle is disclosed. The air intake structure delimits a channel and includes a lip having a U-shaped cross section oriented towards the rear, a first sound-absorbing panel fixed behind the lip and delimiting the channel, and a second sound-absorbing panel fixed behind the first sound-absorbing panel and delimiting the channel. Each sound-absorbing panel includes a cellular core which is fixed between an inner skin pierced with holes and oriented towards the channel, and an outer skin oriented in the opposite direction, where the inner skin of the first sound-absorbing panel has a thickness greater than the thickness of the inner skin of the second sound-absorbing panel, and where each of the inner skins includes a heat source which is embedded in the mass of the inner skin.

20 Claims, 2 Drawing Sheets

(51) Int. Cl.
*B64D 15/04* (2006.01)
*F02C 7/045* (2006.01)
*F02C 7/047* (2006.01)
*B64D 29/00* (2006.01)

(52) U.S. Cl.
CPC .............. *F02C 7/045* (2013.01); *F02C 7/047* (2013.01); *B64D 2033/0206* (2013.01)

(58) Field of Classification Search
CPC ........ B64D 33/02; B64D 15/04; B64D 15/12; F05D 2250/283; Y02T 50/60; F02K 1/827; H05B 2214/02
See application file for complete search history.

(56) References Cited

U.S. PATENT DOCUMENTS

| | | | | |
|---|---|---|---|---|
| 2007/0210073 | A1* | 9/2007 | Hubert | H05B 3/262 |
| | | | | 219/535 |
| 2008/0078611 | A1* | 4/2008 | Inoue | G06F 1/20 |
| | | | | 181/206 |
| 2012/0317782 | A1* | 12/2012 | Porte | B64D 33/02 |
| | | | | 29/428 |
| 2014/0001284 | A1* | 1/2014 | Porte | B64D 33/02 |
| | | | | 239/265.11 |
| 2015/0369127 | A1* | 12/2015 | Gilson | F01D 25/24 |
| | | | | 415/119 |
| 2017/0175775 | A1* | 6/2017 | Ali | F04D 29/522 |
| 2019/0039746 | A1* | 2/2019 | Brooks | B32B 3/266 |
| 2020/0309029 | A1* | 10/2020 | Boileau | B64C 7/02 |
| 2021/0375252 | A1* | 12/2021 | Porte | B64D 29/00 |
| 2022/0049656 | A1* | 2/2022 | Sawyers-Abbott | F02C 7/24 |

FOREIGN PATENT DOCUMENTS

| | | | | |
|---|---|---|---|---|
| EP | 1 826 119 | | 8/2007 | |
| EP | 3068692 B1 * | | 3/2017 | ............. B64D 15/04 |
| EP | 3 181 864 | | 6/2017 | |
| FR | 2 887 518 | | 12/2006 | |
| FR | 2887518 A1 * | | 12/2006 | ............. B64D 15/12 |
| FR | 2917067 A1 * | | 12/2008 | ............. B64D 33/02 |
| FR | 2941676 A1 * | | 8/2010 | ............. B64D 15/04 |
| FR | 2976557 A1 * | | 12/2012 | ............. B64D 15/04 |
| GB | 2547049 | | 8/2017 | |
| WO | WO-2013050698 A1 * | | 4/2013 | ............. B64D 15/00 |
| WO | 2014/197035 | | 12/2014 | |
| WO | WO-2015028757 A1 * | | 3/2015 | ........... B29D 24/007 |
| WO | WO-2020217025 A1 * | | 10/2020 | ............. B64D 33/02 |
| WO | WO-2020239699 A1 * | | 12/2020 | ............... B64C 3/28 |

* cited by examiner

AIR INTAKE STRUCTURE OF AN AIRCRAFT NACELLE

CROSS REFERENCE TO RELATED APPLICATION

This application claims priority to and incorporates by reference French Patent Application Number 1857967, filed Sep. 5, 2018.

BACKGROUND

1. Field of the Invention

The disclosure generally relates to an air intake structure of an aircraft nacelle and, more specifically, to a nacelle comprising such an air intake structure and an aircraft comprising at least one such nacelle.

2. Description of the Related Art

An aircraft turbine engine comprises a nacelle in which the engine assembly is housed. The nacelle, which has an annular shape, has an air intake structure at the front.

The air intake structure globally comprises an inner face and an outer face in contact with the external air, whereas the inner face delimits a channel which constitutes the fan duct. The function of the air intake structure is notably to ensure the aerodynamic flow of the air, on the one hand towards the fan duct, and on the other hand towards the outside of the nacelle.

The air intake structure conventionally comprises an air intake lip, a front reinforcing frame and an acoustic panel.

The air intake lip has a U-shaped cross section open towards the rear, it forms the outer envelope of the forward part of the air intake structure and it ensures the division of the air between the part which enters into the fan duct and the part which flows around the nacelle.

The front reinforcing frame also has a U-shaped cross section open towards the rear and it is placed inside of and at the rear of the air intake lip. The front reinforcing frame provides the mechanical strength of the front part of the nacelle and helps to preserve its shape and dimensions.

The acoustic panel forms the inner envelope of the nacelle, behind the air intake lip, on the fan duct side. The acoustic panel therefore constitutes a part of the inner face.

The acoustic panel has a structure suitable for attenuating the noise produced by the engine and notably by the fan. This acoustic panel is of the composite sandwich type, and it integrates a cellular core, for example of honeycomb form, between an inner wall and an outer wall. The inner wall delimits the fan duct and extends the air intake lip, whilst the outer wall is inside the air intake structure but oriented towards the outside of the nacelle.

The volume between the air intake lip and the front reinforcing frame allows the circulation of a hot air flow which provides the de-icing of the air intake lip.

Although such an air intake structure is entirely satisfactory during its use, it is desirable to find a structure which make it possible to increase the range of frequencies attenuated and to increase the de-iced and sound-absorbing surface.

SUMMARY

The present disclosure is embodied as an air intake structure of an aircraft nacelle which may provide a larger de-iced and sound-absorbing surface.

In an exemplary embodiment, an air intake structure for an aircraft nacelle is embodied to delimit a channel and comprising:
  a lip having a U-shaped cross section oriented towards the rear,
  a first sound-absorbing panel fixed behind the lip and delimiting the channel, and
  a second sound-absorbing panel fixed behind the first sound-absorbing panel and delimiting the channel,
  where each sound-absorbing panel comprises a cellular core which is fixed between an inner skin oriented towards the channel and pierced with holes oriented towards the channel and an outer skin oriented in the opposite direction,
  where the inner skin of the first sound-absorbing panel has a thickness greater than the thickness of the inner skin of the second sound-absorbing panel, and
  where each of the inner skins comprises a heat source which is embedded in the mass of the said inner skin.

Such an air intake structure thus makes it possible to extend the de-iced and sound-absorbing surface from the front of the air intake lip to the rear of the acoustic panel.

The inner skin of the first sound-absorbing panel may have a thickness of 3 to 6 mm.

The inner skin of the second sound-absorbing panel may have a thickness of 0.6 to 2.1 mm.

Each cellular core may have the form of a honeycomb.

The inner skins of the two sound-absorbing panels may form a one-piece element.

According to an exemplary embodiment, at least one of the heat sources is supplied with electrical energy and the heat source is embedded in an electrical insulator.

According to an exemplary embodiment, at least one of the heat sources may be supplied with electrical energy, and the heat source may integrate a vibrating element.

According to an exemplary embodiment, at least one of the heat sources may be formed by tubes in which a hot fluid flows.

For each heat source, the inner skin may comprise an element having heat conducting characteristics which has one face positioned close to the heat source and one face in contact with the channel.

According to an exemplary embodiment, a nacelle is disclosed comprising, at the front, an air intake structure according to one of the preceding embodiments.

According to an exemplary embodiment, an aircraft is disclosed comprising at least one nacelle according to the preceding embodiments.

BRIEF DESCRIPTION OF THE DRAWINGS

For an understanding of embodiments of the disclosure, reference is now made to the following description taken in conjunction with the accompanying drawings, in which.

In the accompanying drawings, like reference characters refer to the same or similar parts throughout the different views. The drawings are not necessarily to scale.

DETAILED DESCRIPTION OF EMBODIMENTS

Some embodiments will now be described with reference to the Figures.

Figure 1:
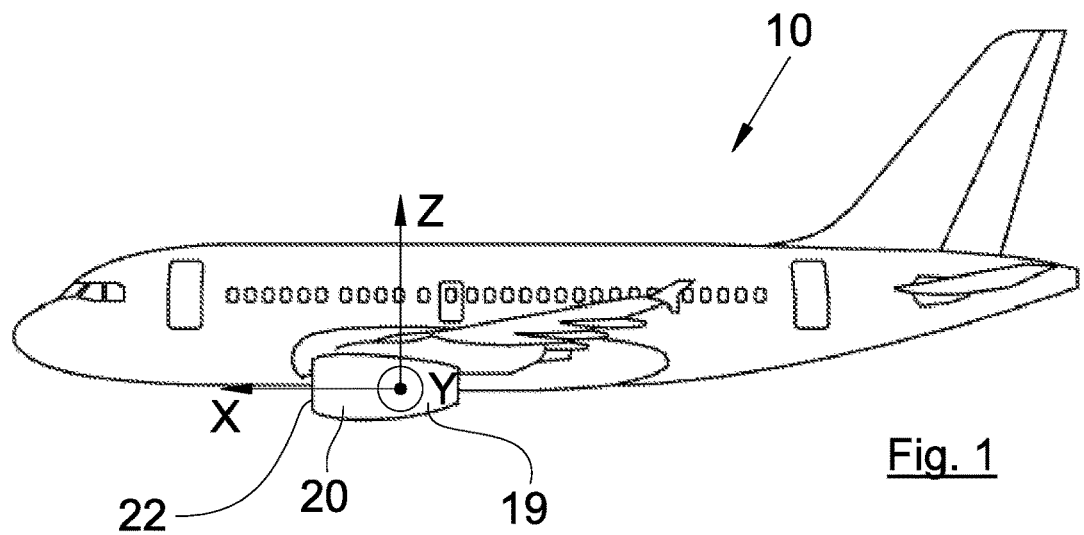
FIG. 1 illustrates a side view of an aircraft according to an exemplary embodiment.

The terms in the disclosure relating to a position are used with reference to an aircraft in a position of moving forwards, as shown in FIG. 1.

FIG. 1 shows an aircraft 10 having at least one turbine engine 20. It is noted that the direction X corresponds to the longitudinal direction of the turbine engine 20 as shown in FIG. 1, this direction being parallel with the longitudinal axis X of the turbine engine 20. On the other hand, the direction Y corresponds to the direction oriented transversely with respect to the turbine engine 20, and the direction Z corresponds to the vertical or height direction. The three directions X, Y, and Z are orthogonal with respect to each other.

The turbine engine 20 comprises a nacelle 19 which includes an air intake structure 22 at a front end thereof. The air intake structure includes a lip which delimits the inside and the outside of the nacelle 19. The lip extends towards the inside by an inner wall which extends around a channel which channels the air towards an engine assembly. The engine assembly comprises, among other things, a fan.

Figure 2:
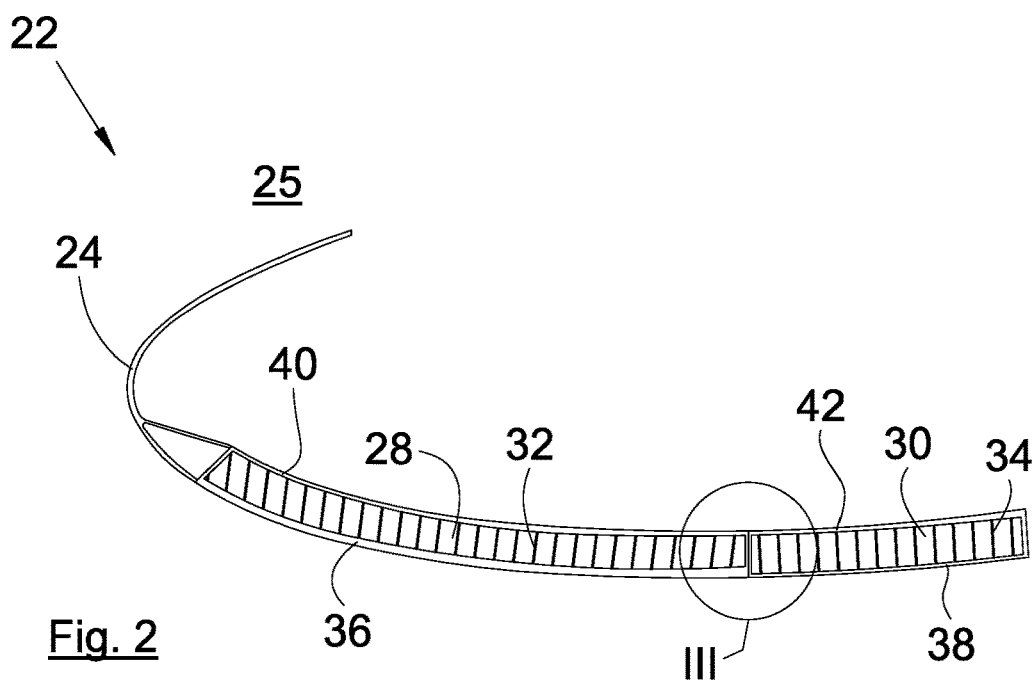
FIG. 2 is a cross-sectional side view of an air intake structure according to an exemplary embodiment.

Referring to FIG. 2, the air intake structure 22 comprises a lip 24 having a U-shaped cross section oriented towards the rear and which globally has an annular shape. The air intake structure 22 delimits a channel 26 which channels the air towards the engine assembly and in particular towards the fan.

The lip 24 delimits the outside 25 and the inside of the nacelle 19. The inside 26 corresponds to the channel 26.

The air intake structure 22 comprises a first sound-absorbing panel 28 around the channel 26, and a second sound-absorbing panel 30, which delimit the channel 26. The first sound-absorbing panel 28 is fixed behind the lip 24 up to the second sound-absorbing panel 30. The second sound-absorbing panel 30 is fixed behind first sound-absorbing panel 28.

The front reinforcing frame has been eliminated and the air intake structure 22 is reinforced by the presence of the first sound-absorbing panel 28 which also has structural capabilities.

Each sound-absorbing panel 28, 30 comprises a cellular core 32, 34 such as, for example, but not limited to, of honeycomb form, which is fixed between an inner skin 36, 38 oriented towards the channel 26, and an outer skin 40, 42 oriented in the opposite direction. The inner skin 36, 38 is pierced with holes oriented towards the channel 26 and allowing sound waves to propagate into the core 32, 34 in order to be attenuated there.

Figure 3:
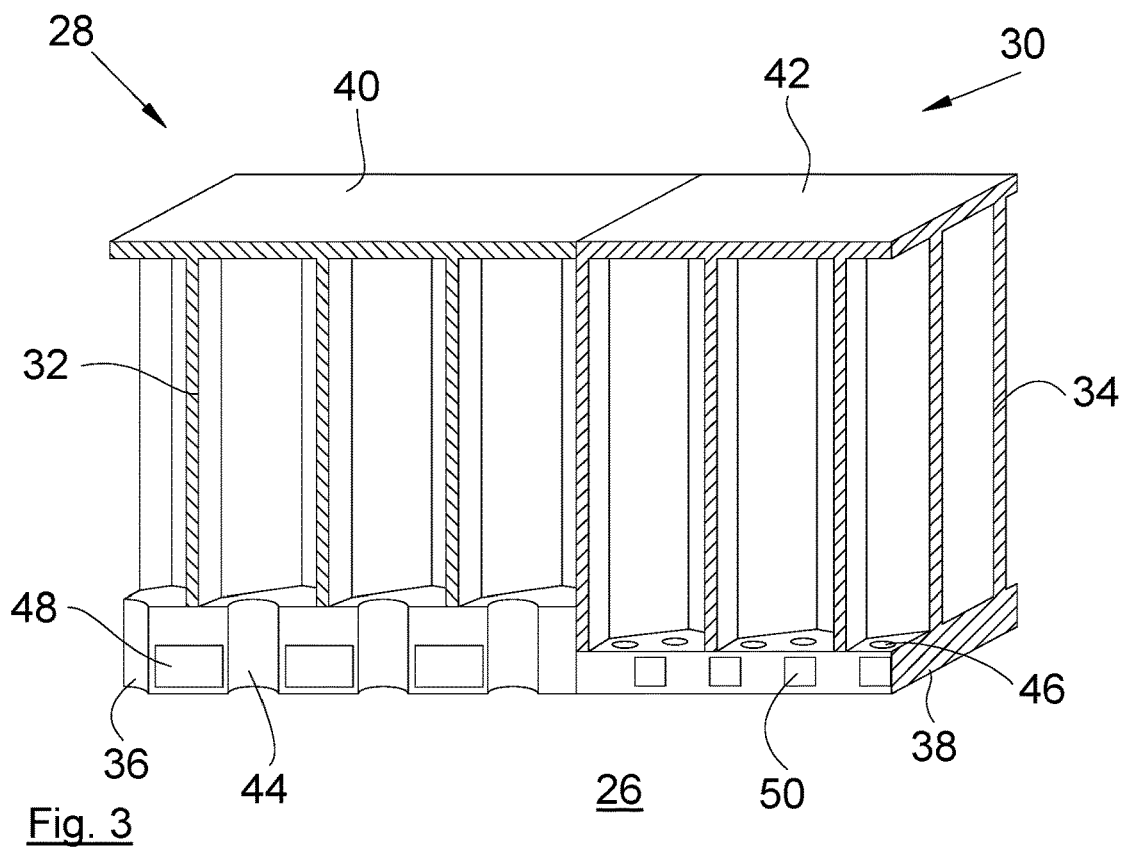
FIG. 3 is a perspective view of the detail III of FIG. 2.

FIG. 3 shows the junction zone between the first sound-absorbing panel 28 and the second sound-absorbing panel 30 where each inner skin 36, 38 is pierced by holes 44, 46.

In general, the inner skin 36 of the first sound-absorbing panel 28 may have a thickness greater than the thickness of the inner skin 38 of the second sound-absorbing panel 30.

The attenuation of the sound waves is therefore increased in comparison with the prior art and the range of frequencies attenuated is also increased by the use of sound-absorbing panels based on two different technologies.

Each of the inner skins 36, 38 comprises a heat source 48, 50 which is embedded in the mass of the said inner skin 36, 38. This heat source 48, 50 makes it possible to de-ice the face of the inner skin 36, 38 which is in the channel 26. Moreover, the surface of the air intake structure 22, which therefore is protected from frost, is extended.

According to an exemplary embodiment, the first sound-absorbing panel 28 is provided for attenuating the low frequencies which range between 400 and 500 Hz. For this purpose, the inner skin 36 of the first sound-absorbing panel 28 has a thickness of 4 mm to 10 mm and the holes 44 therefore also have a length equal to 4 mm to 10 mm. The thickness may be from 3 to 6 mm.

The volumes of the cells of the cellular core 32 into which the holes 44 open and the lengths of the holes 44 make it possible to select the frequency to be attenuated. For example, for a tube height of 4 mm and a cell height of 40 mm, the frequencies around 500 Hz are attenuated.

The second sound-absorbing panel 30 is provided for attenuating the high frequencies which range between 1000 and 4000 Hz. For this purpose, the inner skin 38 of the second sound-absorbing panel 30 has a thickness of the order of 0.5 to 2.5 mm and the holes 46 therefore also have a length of at least 0.5 to 2.5 mm. The thickness may be 0.6 to 2.1 mm.

The face of the inner skin 36 of the first sound-absorbing panel 28, which is oriented towards the channel 26, is flush with the face of the inner skin 38 of the second sound-absorbing panel 30, which is oriented towards the channel 26 in order to produce an aerodynamic surface.

According to an exemplary embodiment, the inner skins 36 and 38 of the two sound-absorbing panels 28 and 30 are one and the same element and, therefore, together may form a one-piece element.

The heat source 48, 50 can be supplied with electrical energy and can for example be an electrically resistive element which heats up when a current passes through it, or it can integrate a vibrating element such as a piezoelectric element. The heat source 48, 50 can for example be formed by tubes in which a hot fluid flows.

Figure 4:
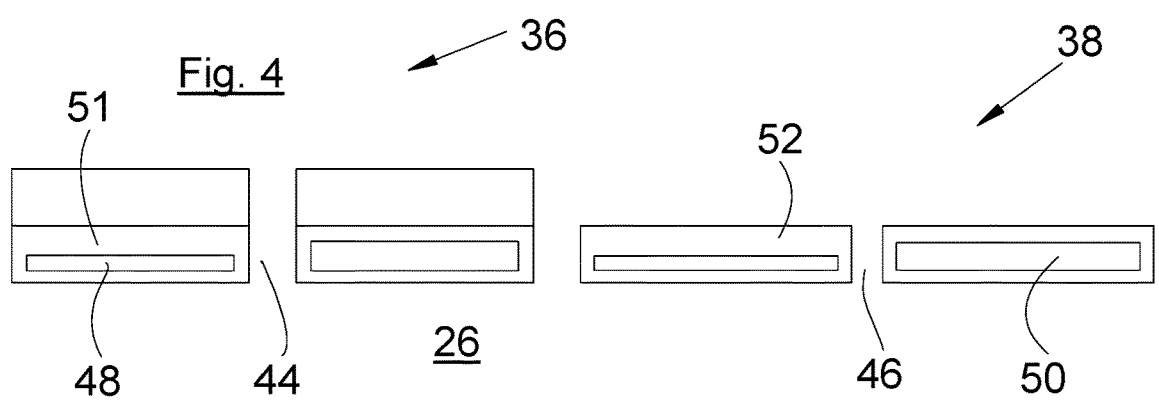
FIG. 4 illustrates a zone of the air intake structure which provides the de-icing according to an exemplary embodiment; and, FIG. 5 illustrates a zone of the air intake structure which provides the de-icing according to another exemplary embodiment.

FIG. 4 shows the inner skins 36 and 38 in which the heat sources 48 and 50 are embedded. Depending on the de-icing requirements, the quantity of heat required can vary along the inner skins 36, 38. The dimensions of the heat sources 48, 50 can therefore be different for different positions.

In an exemplary embodiment, the heat source 48, 50 may be embedded in an electrical insulator 51, 52 which prevents a short-circuit and, for example, contact with a technician during maintenance.

Figure 5:
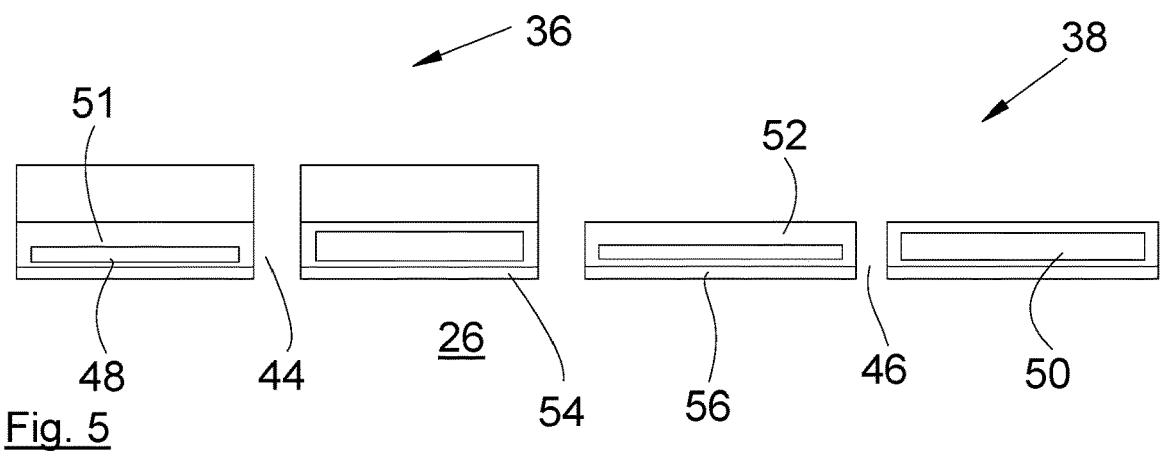

Referring to FIG. 5, the inner skins 36 and 38 for which an element 54, 56 have heat conducting characteristics is disposed in such a way as to guide the heat coming from the heat sources 48, 50 to the place where the heat must be dissipated for de-icing, in this case in contact with the channel 26. Each element 54 has one face which is positioned close to the heat source 48, 50 and another face in contact with the channel 26.

In the case of a non-electrical heat source 48, 50, the element 54 can be in contact with the heat source 48, 50.

In the case of an electrical heat source 48, 50, the element 54 is separated from the heat source 48, 50 by the electrical insulator 51, 52.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. Air intake structure for an aircraft nacelle, the air intake structure delimiting a channel, comprising:
    a lip having a U-shaped cross section oriented towards a rear,
    a first sound-absorbing panel fixed behind the lip and delimiting the channel, and
    a second sound-absorbing panel fixed behind the first sound-absorbing panel and delimiting the channel,
    wherein each sound-absorbing panel comprises a cellular core fixed between an inner skin oriented towards the channel and pierced with holes oriented towards the channel, and an outer skin oriented in the opposite direction,
    wherein the inner skin of the first sound-absorbing panel has a thickness greater than the thickness of the inner skin of the second sound-absorbing panel, and
    wherein each of the inner skins comprises a heat source which is embedded in the mass of the inner skin.

2. The air intake structure according to claim 1, wherein the inner skin of the first sound-absorbing panel has a thickness of 3 to 6 mm.

3. The air intake structure according to claim 1, wherein the inner skin of the second sound-absorbing panel has a thickness of 0.6 to 2.1 mm.

4. The air intake structure according to claim 1, wherein each cellular core has the form of a honeycomb.

5. The air intake structure according to claim 1, wherein the inner skin of the first and the second sound-absorbing panels forming a one piece element.

6. The air intake structure according to claim 1, wherein at least one of the heat sources is supplied with electrical energy and in that the heat source is embedded in an electrical insulator.

7. The air intake structure according to claim 1, wherein at least one of the heat sources is supplied with electrical energy, and in that the heat source integrates a vibrating element.

8. The air intake structure according to claim 1, wherein at least one of the heat sources is formed by tubes in which a hot fluid flows.

9. The air intake structure according to claim 1, wherein for each heat source, the inner skin of the first and the second sound-absorbing panels comprise an element having heat conducting characteristics which has one face positioned close to the heat source and one face in contact with the channel.

10. A nacelle, comprising an air intake structure having a lip having a U-shaped cross section oriented towards a rear,
    a first sound-absorbing panel fixed behind the lip and delimiting the channel, and
    a second sound-absorbing panel fixed behind the first sound-absorbing panel and delimiting the channel,
    wherein each sound-absorbing panel comprises a cellular core fixed between an inner skin oriented towards the channel and pierced with holes oriented towards the channel, and an outer skin oriented in the opposite direction,
    wherein the inner skin of the first sound-absorbing panel has a thickness greater than the thickness of the inner skin of the second sound absorbing panel, and
    wherein each of the inner skins comprises a heat source which is embedded in the mass of the inner skin,
    wherein the air intake structure is positioned in a front portion thereof.

11. The nacelle according to claim 10, wherein the inner skin of the first sound-absorbing panel has a thickness of 3 to 6 mm.

12. The nacelle according to claim 10, wherein the inner skin of the second sound-absorbing panel has a thickness of 0.6 to 2.1 mm.

13. The nacelle according to claim 10, wherein each cellular core has the form of a honeycomb.

14. An aircraft, comprising at least one nacelle having an air intake structure including a lip having a U-shaped cross section oriented towards a rear,
    a first sound-absorbing panel fixed behind the lip and delimiting the channel, and
    a second sound-absorbing panel fixed behind the first sound-absorbing panel and delimiting the channel,
    wherein each sound-absorbing panel comprises a cellular core fixed between an inner skin oriented towards the channel and pierced with holes oriented towards the channel, and an outer skin oriented in the opposite direction,
    wherein the inner skin of the first sound-absorbing panel has a thickness greater than the thickness of the inner skin of the second sound absorbing panel, and
    wherein each of the inner skins comprises a heat source which is embedded in the mass of the inner skin,
    wherein the air intake structure is positioned in a front portion thereof.

15. The aircraft according to claim 14, wherein the inner skin of the first sound-absorbing panel has a thickness of 3 to 6 mm.

16. The aircraft according to claim 14, wherein the inner skin of the second sound- absorbing panel has a thickness of 0.6 to 2.1 mm.

17. The aircraft according to claim 14, wherein each cellular core has the form of a honeycomb.

18. The aircraft according to claim 14, wherein at least one of the heat sources is supplied with electrical energy and in that the heat source is embedded in an electrical insulator.

19. The aircraft according to claim 14, wherein at least one of the heat sources is supplied with electrical energy, and in that the heat source integrates a vibrating element.

20. The aircraft according to claim 14, wherein at least one of the heat sources is formed by tubes in which a hot fluid flows.

* * * * *